(12) United States Patent
Even

(10) Patent No.: US 7,113,992 B1
(45) Date of Patent: Sep. 26, 2006

(54) DECOMPOSITION ARCHITECTURE FOR AN MCU

(75) Inventor: Roni Even, Tel-Aviv (IL)

(73) Assignee: Polycom, Inc., Pleasanton, CA (US)

( * ) Notice: Subject to any disclaimer, the term of this patent is extended or adjusted under 35 U.S.C. 154(b) by 770 days.

(21) Appl. No.: 09/852,438

(22) Filed: May 9, 2001

Related U.S. Application Data

(63) Continuation-in-part of application No. 09/708,898, filed on Nov. 8, 2000.

(60) Provisional application No. 60/164,298, filed on Nov. 8, 1999.

(51) Int. Cl.
*G06F 15/16* (2006.01)

(52) U.S. Cl. .................. 709/227; 709/204; 379/202.01

(58) Field of Classification Search ................ 370/352, 370/260, 216, 217, 401; 709/229, 227, 204; 379/202.01
See application file for complete search history.

(56) References Cited

U.S. PATENT DOCUMENTS

| | | |
|---|---|---|
| 4,362,928 A | 12/1982 | Sheldon |
| 5,318,614 A | 6/1994 | Beguin |
| 5,473,363 A | 12/1995 | Ng et al. |
| 5,535,373 A | 7/1996 | Olnowich |
| 5,563,882 A | 10/1996 | Bruno et al. |
| 5,600,646 A | 2/1997 | Polomski |
| 5,684,527 A | 11/1997 | Terui et al. |
| 5,689,553 A | 11/1997 | Ahuja et al. |
| 5,694,544 A | 12/1997 | Tanigawa et al. |
| 5,740,161 A | 4/1998 | Porter et al. |
| 5,821,985 A | 10/1998 | Iizawa |
| 5,822,301 A | 10/1998 | Arnold et al. |
| 5,838,664 A | 11/1998 | Polomski |
| 5,867,494 A * | 2/1999 | Krishnaswamy et al. ... 370/352 |
| 5,867,653 A | 2/1999 | Aras et al. |

(Continued)

FOREIGN PATENT DOCUMENTS

EP   0 794 645 A2   10/1997

OTHER PUBLICATIONS

IETF RFC Documents 2805, 2885,3015,3054.*

(Continued)

*Primary Examiner*—William Vaughn
*Assistant Examiner*—Greg Bengzon
(74) *Attorney, Agent, or Firm*—Wong, Cabello, Lutsch, Rutherford & Brucculeri, LLP

(57) ABSTRACT

The present invention allows the resources of multiple multipoint control units (MCUS) in a multipoint multimedia communication system. A plurality of multimedia terminals support different multimedia conferencing protocols, and a multipoint control unit communicates with a multipoint processor unit and with the multimedia terminals for signaling and call control. At least one multipoint processor unit communicates with the plurality of multimedia terminals for media and optionally call signaling and call control. The multipoint processor unit also communicates with the multipoint control unit for interfacing the call signaling and the call control information between said multipoint control unit and the terminals.

17 Claims, 6 Drawing Sheets

U.S. PATENT DOCUMENTS

| | | |
|---|---|---|
| 5,894,321 A | 4/1999 | Downs et al. |
| 5,898,676 A | 4/1999 | Apfelbeck et al. |
| 5,983,269 A | 11/1999 | Mattson et al. |
| 5,995,608 A | 11/1999 | Detampel, Jr. et al. |
| 6,006,253 A | 12/1999 | Kumar et al. |
| 6,181,696 B1 | 1/2001 | Fielding et al. |
| 6,212,602 B1 | 4/2001 | Wicki et al. |
| 6,487,196 B1* | 11/2002 | Verthein et al. ............ 370/352 |
| 6,591,301 B1* | 7/2003 | Li et al. ..................... 709/229 |
| 6,614,781 B1* | 9/2003 | Elliott et al. ................ 370/352 |
| 6,657,975 B1* | 12/2003 | Baxley et al. .............. 370/260 |
| 6,738,343 B1* | 5/2004 | Shaffer et al. .............. 370/216 |
| 6,795,429 B1* | 9/2004 | Schuster et al. ............ 370/352 |
| 6,856,676 B1* | 2/2005 | Pirot et al. ............. 379/201.01 |
| 6,885,658 B1* | 4/2005 | Ress et al. .................. 370/352 |

OTHER PUBLICATIONS

International Search Report received in PCT/IB 00/01764, dated Jun. 22, 2001.

J. Toga, et al.: "ITU-T Standardization Activities for Interactive Multimedia Communications on Packet-Based Networks: H.323 and Related Recommendations".

\* cited by examiner

DECOMPOSITION ARCHITECTURE FOR AN MCU

RELATED APPLICATIONS

This application is a continuation-in-part of U.S. patent application Ser. No. 09/708,898, filed Nov. 8, 2000, the contents of which are incorporated herein by reference. The present application further claims the benefit of priority from U.S. Provisional Application Ser. No. 60/164,298 filed Nov. 8, 1999, the contents of which are incorporated herein by reference.

FIELD OF THE INVENTION

This invention relates generally to multimedia communications, and more specifically, to a system and method for decomposing a multipoint multimedia communication system to control unit and process unit.

BACKGROUND

As the geographical domain in which companies conduct business continues to expand, the traffic of multimedia teleconferencing overloads multimedia communication central nodes. In the current market, most multipoint multimedia calls are scheduled in advance through companies that own multipoint control units (MCUs). An MCU provides the capability for three or more terminals and gateways to participate in a multipoint conference. If a company owns more than one MCU, it has more flexibility in hosting multimedia conferences. However, each MCU must be operated independently from the other MCUs in setting up and controlling multimedia conferences. Additionally, the capacity of each MCU is limited to multimedia conferences controlled by the corresponding MCU. Because each MCU is a single entity that handles both the call signaling and the media processing of the conference, the resources of the multiple MCUs cannot be combined to promote more efficient scheduling.

As the business of multimedia conferences continues to expand, more and more standards have been written for multimedia conferences, such as H.320, H.321, H.324, and H. 323 SIP. Those standards handle the call signaling and call control differently, yet use the same multimedia data standards such as H.261, H.263, MPEG, G.711, and T.120. The increasing number of multimedia conferences and standards drive the need for an MCU technology that is able to operate efficiently in a site utilizing a plurality of MCUs, which may share resources in order to increase the amount of traffic via the site. Furthermore, there is a need for technology easily adaptable to varying standards and increasing capacity.

The ITU and the IETF have defined a decomposition architecture for a multimedia gateway, which comprises of a multimedia gateway control unit (MGC), a multimedia process unit (MG), and the intermediary communication protocol, Megaco/H.248. The MCU, as defined in the H.323 standard, comprises of a Multipoint Controller (MC) and a Multipoint Processor (MP). The MC is an H.323 entity on the network that provides the control of three or more terminals participating in a multipoint conference. The MC may also connect two terminals in a point-to-point conference, which may later develop into a multipoint conference. The MC provides capability negotiation with all terminals to achieve common levels of communications, and may also control conference resources. However, the MC does not perform mixing or switching of audio, video and data.

The Multipoint Processor (MP) is an H.323 entity on the network providing the centralized processing of audio, video, and/or data streams in a multipoint conference. The MP provides the mixing, switching, or other processing of media streams under the control of the MC. The MP may process a single media stream or multiple media streams depending on the type of conference supported. The ITU has not defined the communication protocol between those two units in H.323, or a Decomposition MCU (DMCU) for other standards then H.323. One difficulty in operating the DMCU with other standards, such as H.320, is that signaling, control and media are multiplexed.

The decomposition architecture offers better utilization of resources, for one MC can control plurality of MPs, and a conference can share resources in a plurality of units etc. Also, an operator can upgrade its site by adding the appropriate units MP or MC according to it's the operator's needs. Those units can be from different vendors. In case of new versions or new standards the operator can update only the relevant unit MP or MC.

The MC functionality can be part of a general Media Gateway Controller (MGC). The MC can be considered as an MGC. Therefore, it is evident that there is a need for a DMCU that can work with plurality of endpoints supporting different standards.

SUMMARY OF THE INVENTION

The present invention provides a general DMCU that is not limited to H.323 and can also work for other standards like but not limited to H.320; H.321; H.324; and SIP. The DMCU comprises of a MC and a MP. The MC handles the call signaling and control while the MP handles the media streams. In cases where signaling, control and media are multiplexed (H.320; H.321 etc.) the MP will demultiplex/multiplex the streams and then uses signaling, tunneling or backhauling to send and receive control or signaling messages to and from the MC. The DMCU will address the different conferencing models as described in H.323, including centralized, decentralized and hybrid multipoint conference. In the case of decentralized or hybrid conference, a virtual MP may exist, even as part of the MC, and will support the media handling for the MC. In centralized conference all participating terminals communicate in a point-to-point fashion with an MCU. The terminals transmit their control, audio, video, and/or data streams to the MCU. The MC within the MCU centrally manages the conference. The MP within the MCU processes the audio, video, and/or data streams and returns the processed streams to each terminal.

A decentralized multipoint conference is one in which the participating terminals multicast their audio and video to all other participating terminals. The terminals are responsible for:

a) summing the received audio streams; and
b) selecting one or more of the received video streams for display. No audio or video MP is required in this case. The terminals communicate on their H.225, RAS and H.245 Control Channels with an MC that manages the conference. The data stream is still centrally processed by the MCU.

There are two types of hybrid multipoint conferences. A hybrid multipoint centralized audio conference is one in which terminals multicast their video to other participating terminals and unicast their audio to the MP for mixing. The MP returns a mixed audio stream to each terminal. A hybrid multipoint centralized video conference is one in which terminals multicast their audio to other participating terminals and unicast their video to the MP for switching or mixing. The MP returns a video stream to each terminal.

According to H.248, the logical entities in MP that can be controlled by the MC include terminations and contexts. A termination is a logical entity on a MP that sources and/or sinks media and/or control streams. A termination is described by a number of characterizing properties, which are grouped in a set of descriptors that are included in commands. A descriptor is a syntactic element that groups related properties. For instance, the properties of a media flow on the MP can be set by the MC by including the appropriate descriptor in a command. Terminations have unique identities (termination IDs), assigned by the MP manager at the time of their creation.

Terminations representing physical entities have a semi-permanent existence. For example, a termination representing a TDM channel might exist for as long as it is provisioned in the DMCU. Terminations representing ephemeral information flows, such as RTP flows, would usually exist only for the duration of their use. Ephemeral terminations are created by means of an Add command. They are destroyed by means of a Subtract command. In contrast, when a physical termination is added to or subtracted from a context, it is taken from or to the null Context, respectively.

Terminations may have signals applied to them. Signals are MP generated media streams such as tones and announcements. Terminations may be programmed to detect Events, the occurrence of which can trigger notification messages to the MC, or action by the MP. Statistics may be accumulated on a termination. Statistics are reported to the MC upon request (by means of the AuditValue command,) and when the termination is removed from a call.

The protocol between the two units, MC and MP, can be used to create new terminations and to modify property values of existing terminations. These modifications include the possibility of adding or removing events and/or signals. An MC can only release/modify terminations and the resources that the termination represents that it has previously seized via, e.g., the Add command. Example terminations include MUX/DEMUX, ISDN ports, and audio mixers.

A context is an association between numbers of terminations. The context can describe the topology (who hears/sees whom) and the media mixing and/or switching parameters if more than two terminations are involved in the association. A special context called the null context contains terminations that are not associated to any other termination. Terminations in the null context can have their parameters examined or modified, and may have events detected on them.

In general, an Add command is used to add terminations to contexts. If the MC does not specify an existing context to which the termination is to be added, the MP creates a new context. A termination may be removed from a context with a subtract command, and a termination may be moved from one context to another with a Move command. A termination SHALL exist in only one context at a time. The maximum number of terminations in a context is an MP property. DMCU that support multipoint conferences might allow three or more terminations per context.

The attributes of contexts are ContextID and the topology (who hears/sees whom). An exemplary context can be a videoconference of 3 participants: one is using an H.323 endpoint and two are using H.320 endpoint with bit rate that is different from the first one. This context includes the following terminations: three networks I/F ports, one RTP, two MUXes, an audio mixer and a video mixer. The present invention implements a DMCU by using the connection model and protocol that is described in H.248. The present invention allows communication and resources sharing between plurality of MCs and MPs.

The MC includes the part of the call state that handles the call signaling and call control of the MPs that are connected to it. The MC can be a software program residing in a General Media Gateway controller. Other objects, features, and advantages of the present invention will become apparent upon reading the following detailed description of the embodiments of the invention, when taken in conjunction with the accompanying drawings and appended claims.

DETAILED DESCRIPTION

Figure 1:
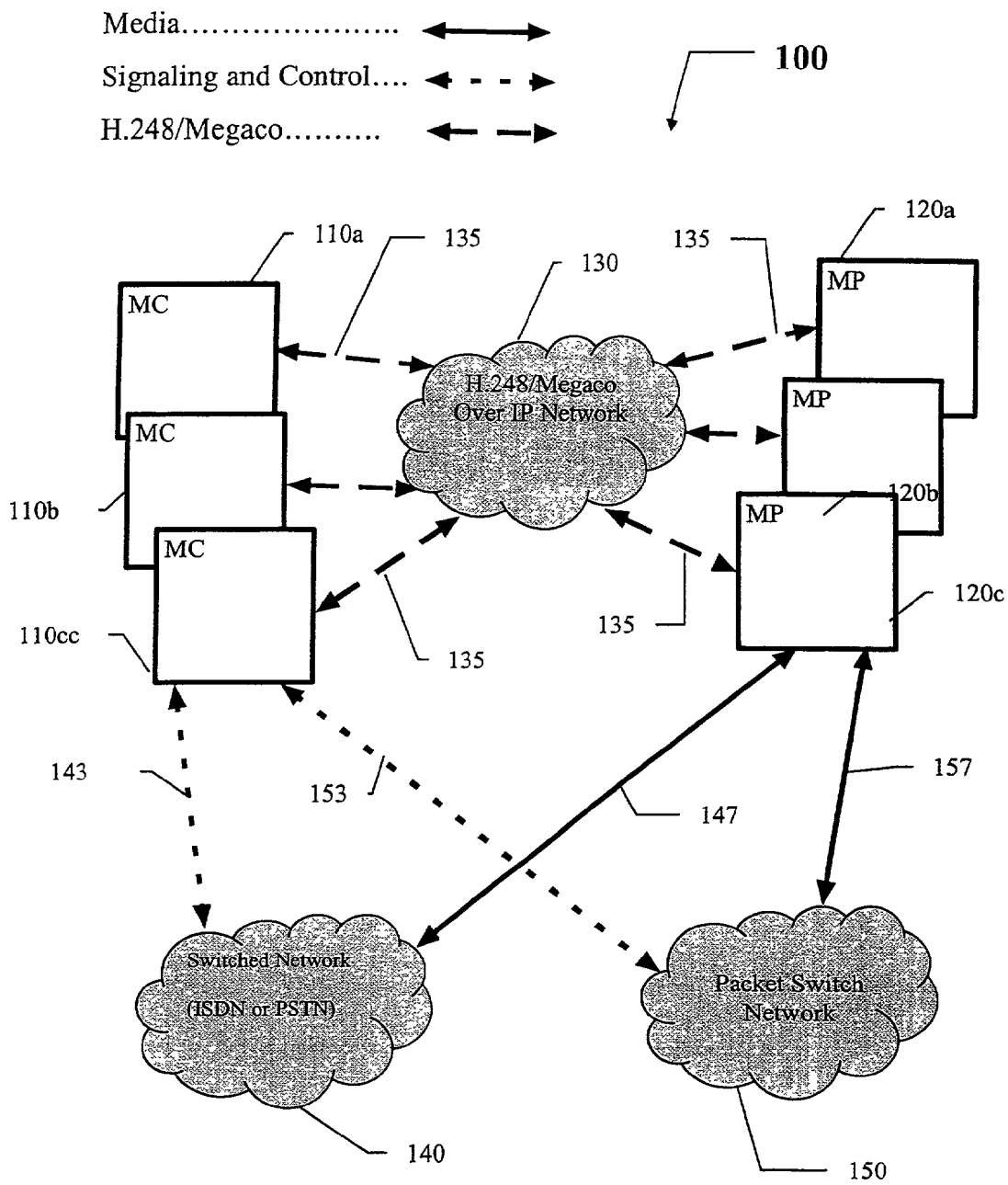
FIG. 1 is a system diagram that illustrates an exemplary operator site implementing various embodiments of the present invention.

Referring now to the drawings, in which like numerals refer to like parts throughout the several views, exemplary embodiments of the present invention are described.

FIG. 1 is a system diagram that illustrates an exemplary operator site 100 implementing various embodiments of the present invention. The site 100 may include one or more DMCUs: (110*a*; 120*a*); (110*b*; 120*b*) and (110*c*; 120*c*). An exemplary DMCU comprises of one MC (110*a*; 110*b*; 110*c*) and one MP (120*a*; 120*b*; 120*c*) respectively. Although three DMCUs are illustrated, the present invention is not limited to a particular number of DMCUs and the presented configuration is intended to be illustrative of an exemplary configuration. An MC can control one or more MPs. The connection between the MC and MP that compose a DMCU is based on H.248/Megaco over IP it may be over an Intranet 130, Internet LAN, or direct connection. The MCs and the MPs may be co-located or geographically dispersed.

In an exemplary system, each DMCU supports connections with various types of terminals (not shown) including, but not limited to, H.321H.324 and H.320 terminals. Those terminals are connected to Switched Circuit Networks (SCN) 140 like but not limited to PSTN and ISDN. The exemplary system 100 also supports H.323 and SIP terminals (not shown) that are connected to packet switch network 150, including but not limited to, local area networks, the Internet or an Intranet. The connections to the terminals are illustrated as network clouds (140 and 150). Connection cloud 140 is connected to the MCs via signaling and control line 143 and to the MPs via the media line 147. Connection cloud 150 is connected to the MCs via signaling and control line 153 and to the MPs via the media line 157.

Lines 143 and 153 represent an exemplary functional architecture of signaling and control connection. The signaling and control can also be physically connected to the MP. The MP transfers those signals via tunneling or backhaul to the appropriate MC. Those skilled in the art will appreciate that other terminal protocols and other networks could be used in alternative embodiments.

A terminal is an endpoint on a network, capable of providing real-time, two-way multimedia communication; audio and/or visual communication and/or data with other terminals or an MCU. The information communicated between the terminals and/or the MCU includes, but is not limited to, control signals, indicators, audio, moving color video pictures and data. A terminal may provide speech only, speech and data, speech and video, or speech, data and video. In another exemplary configuration of a DMCU an MC may control more than one MP via the same IP network 130.

Figure 2:
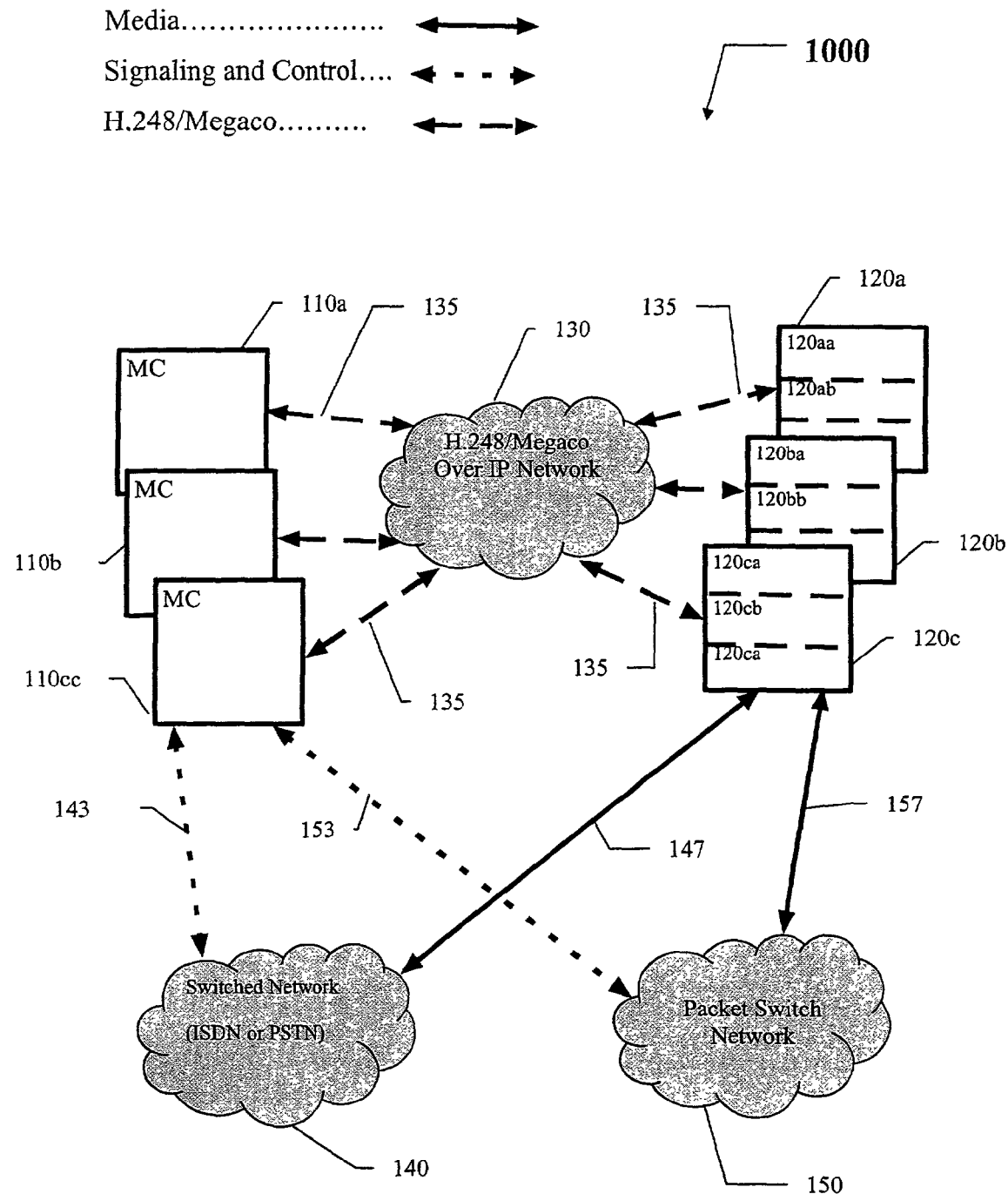
FIG. 2 is a system diagram that illustrates another exemplary operator site.

FIG. 2 is a system diagram that illustrates another exemplary operator site 1000 that using another exemplary configuration of a DMCU, in which more than one MC, via the same IP network, 130 may control a single MP. In this configuration each physical MP (120a; 120b; 120c) may be divided into several logical MPs. For instance MP 120a may be divided into Logical MPs 120aa; 120ab and 120ac and a different MC (110a; 110b; 110c) may control each logical MP respectively. For example, MC 110b controls Logical MP 120ab.

Another exemplary configuration of a DMCU (not shown in the drawings) utilizes the architecture of a Virtual MCU (VMCU). In this configuration one of the MCs becomes a Decomposed VMCU (DVMCU) and uses similar methods to control the other MCs and MPs as the methods that the VMCU uses to control the MCUs. The communication between the DVMCU the MPs and the other MCs is done over an IP network. Those skilled in the art will appreciate that an operator site may comprise of any of the above configurations of a DMCU or any combination of those configurations.

Figure 3:
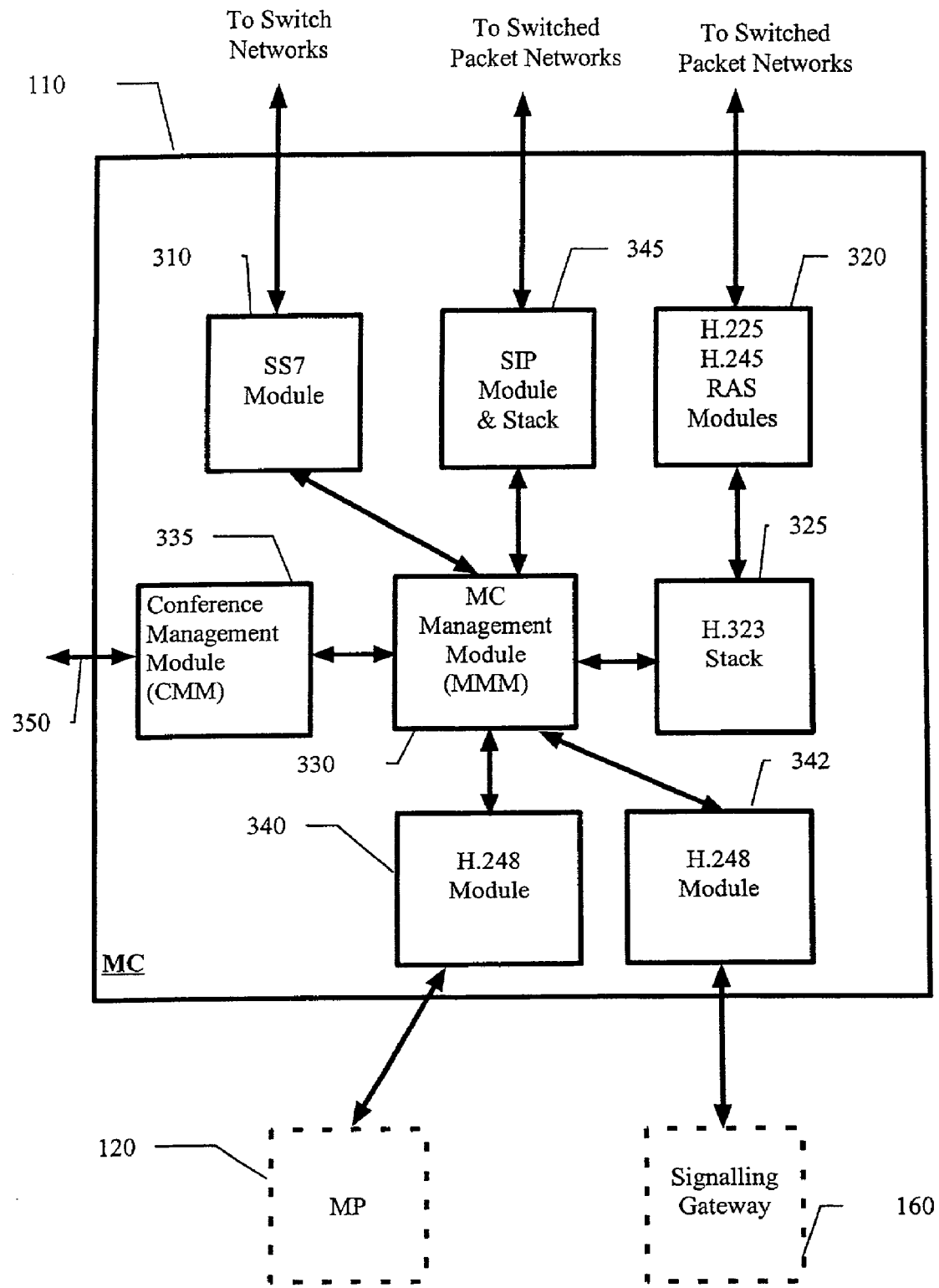
FIG. 3 is a functional block diagram of an exemplary MC.

FIG. 3 is a functional block diagram of an exemplary MC 110. The MC 110 is a platform independent system solution for controlling one or more MPs (120a, 120b, 120c). The MC may be a physical unit or a software program residing in a Media Gateway Controller (MGC) or a software program residing in a conventional MCU.

In an exemplary embodiment of the present invention, the MC 110 includes several modules that are controlled by an MC Management Module (MMM) 330. The modules that the MC includes, like but are not limited to: SS7 Module 310; H.225, H.245 & RAS Module 320; H.323 Stack 325; SIP Module and stack 345; Conference Management Module (CMM) 335 and H.248 Module 340. The CMM 335 may be a part of the MC or it can be an external module that resides in an external general computer system.

The MC 110 is connected, in both directions, to the H.225; H.245 & RAS Module 320; SIP Module 345 H.248 Module 340 and the SS7 Module 310. The MC communicates with H.323 Endpoint, which are connected to Packet switched network via H.225; H.245 & RAS Module 320. Said module 320 comprises of three sub modules for processing the H.323 components: H.225 sub module which processes the call signaling, H.245 which processes the call control information and the RAS sub module for processing the registration, admission and status component. The information is then processed by the H.323 Stack 325 and the processed information is transferred to the MMM 330. Each MC may include plurality of H.225; H.245 & RAS Modules 320 one per each switched packet networks that the MC is connected to.

The MC communicates with SIP endpoints, which are connected to the packet switch network via the SIP module 345 for call signaling and call control. The information is processed by the SIP stack and is transferred to MMM 330. Users, which are connected over SCN, communicate with the MC 110 via the MP 120 or via Signaling Gateway 160 through additional H.248 Module 342 via a signaling protocol like SS7 through SS7 Module 310. In communication with endpoints, which use protocols such as H.320, H.321, and H.324, the MP 120 MUX/DEMUX the signaling and control components from the multiplexed stream, transcode them into H-248/Megaco protocol and transfer them to the MC 110 via H.248 Module 340. The SS7 module 310 conveys the Non-Facility Associated Signaling (NFAS) SCN signaling to the MMM 330. This module provides the flexibility to conserve SS7 code points and allows the SS7 switch to serve multiple DMCUs.

The MMM 330 manages the resources (terminations) of the MPs 120 that are controlled by the MC 110 and the events that occur. The MMM 330 may use an internal or external CMM 335 which comprises a plurality of multimedia conferencing management tools including but not limited to a conference reservation manager, a conference manager, a reports manager, a system administrator tool, and databases.

The CMM 335 is connected to the external world via an IP connection 350. The external connection enables management communication with the customers, including but not limited to, conference reservation and requests for reports. The CMM 335 acts as the interface between the customer and the MC and manages the conference reservations and reports while the MMM 330 controls the ongoing conferences (contexts).

The Conferences Reservation Manager accepts requests for multimedia session reservations via an IP connection 350 and uses the reservation parameters to verify that it can be accepted. The reservation parameters include but are not limited to the number and types of terminals, line-speed, type of audio algorithm, start-time, end-time, video algorithm and the type of network. The Conferences Reservation Manager then stores the reservation record in the database. If the session has to start immediately, the Conferences Reservation Manager passes the information to the MMM 330. The Conferences Manager starts a session when the session's time to start arrives. The Conferences Manager loads the session onto the target MP via the MMM 330 and H.248 module 340 and gets status information from all of the MPs concerning ongoing sessions.

The Reporting Manager builds reports which may include length of time terminations were used, particular terminations used for a specific session, and percentage of terminations used during a specified time period. The reports are built upon the receipt of a report request from the site operator via an IP connection 350. The System Administrator serves as an input tool for the MC parameters. The MC parameter may include, but are not limited to, the maximum number of MPs controlled by the MC, and neighbor MCs. In an exemplary embodiment of the present invention, the databases store data pertaining to reservations, users, and any other data required for the operation of the DMCU. The database can be an external database such as a database using LDAP or ILS.

The MMM 330 keeps the information concerning the MPs terminations i.e. audio terminations, video terminations, etc. When the MMM 330 gets a request to initiate a conference from CMM 335 it allocates the appropriate terminations to a context that represents the requested conference. An exemplary method for initiate a conference is describing below in conjunction with FIG. 6.

The MMM 330, based on the available terminations of an MP, also calculates terminations availability for future contexts reservations. The MMM 330 may receive messages, such as call start and call terminate, from the MP and stores the messages in a database. The MMM 330 provides for capability negotiation with all terminals to achiever common levels of communications based on the signaling and controls signals that it receives from the various terminals and MPs via H.323 Stack 325 and/or H.248 Module 340 and with cooperation with CMM 335. The MMM 330 may also control conference resources and may start and terminate the call signaling and control. The MMM 330 decides which MP 120 will handle a context (conference) and the terminations in said MP that will be in said context. Then MMM 330 manages the termination and streams in the context according to the current status of the conference.

Figure 4:
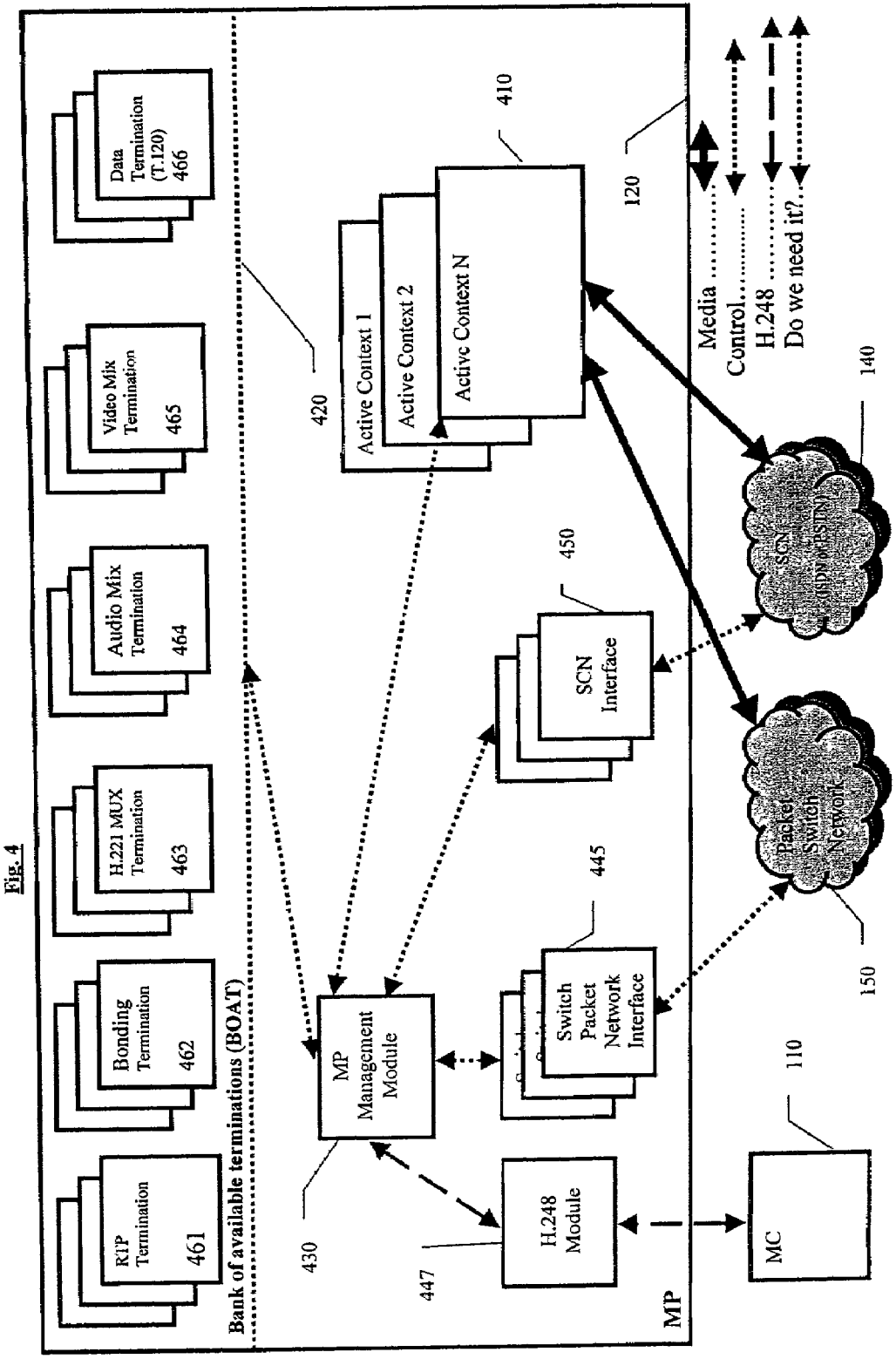
FIG. 4 is a functional block diagram of an exemplary MP.

FIG. 4 is a functional block diagram of an exemplary MP 120. The MP 120 provides media processing, mixing, switching, transcoding or other processing of media streams (Audio, Video and Data) under the control of the MC. The MP may process a single media stream or multiple media streams depending on the type of conference supported.

In the cases where signaling, control and media are multiplexed (H.320; H.321 H.324 etc.) the MP will demultiplex the streams, and to transfer the call control and/or the call signaling messages to the MC 110, using signaling, tunneling or backhaul.

In an exemplary embodiment of the present invention, a functional MP 120 includes several modules, including but not limited to a plurality of switch packet network Interface (SPNI) 445; H.248 Module 447; SCN Interface 450 plurality of active context 410, and a Bank of Available Terminations (BOAT) 420. An MP Management Module (MPMM) 430 controls those modules. The BOAT 420 comprises of several groups of terminations 461 to 466, each group includes plurality of terminations from the same type. A termination can be a physical entity or a logical entity that is composed from physical entities allocated to said termination by the MPMM when the termination is added to a context.

Although three active contexts 410, three SCN Interfaces 450, three SPNI 445 and three terminations in a group are illustrated, the present invention is not limited to a particular number and the presented configuration is intended to be illustrative of an exemplary configuration.

Some of the units and terminations that compose the MP 120 are units that exist in a typical MCU such as Accord MGC 100. The DMCU manages those units in novel method. The unique modules of an MP are MPMM 430 and H.248 Module 340. The MP may be a physical unit or a software adaptation of a conventional MCU. The MP may be also a Software program running on a general computer.

The MP 120 receives and transmits operational control to and from the MC 110 via H.248 Module 447. Media communication with the users is done directly through the appropriate context 410. Detail description of an exemplary context is done below in reference to FIG. 5.

Although call set up, call control, call signaling and call management are done by the MC 110, the MP 120 can tunnel them between the SCN 140 or the packet switch network 150 users and the MC 110. The MP includes plurality of SCN Interface Modules 450. Each Module 450 accepts a SCN dial in number. In the event that one of the connections is involving in a current context then its SCN Interface Module 450 becomes a part of the context 410.

Bonding termination 462 handles the bonding of the N ISDN 64 kbit channels to one call. More information about bonding can be found in standard ISO/IEC 13871 in website. H.221 MUX termination 463 is handling the multiplexing and demultiplex of the H.221 stream, and receives the bit rate of the call, the structure of the H.221 stream and demultiplexes the stream to audio, video, data and control streams. The control information is transferred to MPMM 430 that may use part of the information and transfer the information, which is required by the MC 110, to H.248 Module 447.

H.248 Module 447 transmits this information to the appropriate MC using H.248/Megaco/IP protocol. The connection between the MP and the MC can be by direct connection or via IP network, such as Intranet, Internet; LAN etc. If an endpoint is already connected to an active conference via a context 410, then the SCN Interface module 450 becomes part of said context 410 and transfers the video, audio and data to the appropriate video mixer termination 465; audio mixer termination 464 and data termination 466, which belong to the same context. The H.221 MUX 463 also handles H.221 channel association.

The media processing resources of an exemplary MP 120 includes Audio Mixer Terminations 464; Video Mixer Terminations 465 and Data Terminations 466. The Audio Terminations (AMT) 464 handles the audio mixing. The mixer will accept audio streams from all participants and will mix them. The mixing options will be either the N loudest speakers or N specific streams. The audio mixer signals the stream ID of the loudest speaker and the Ids of the mixed streams.

When an RTP or H.221 MUX termination is modified or added, the audio mixer is modified with the stream ID and the audio codec of the stream.

Video Mix Termination (VMT) 465 can be of one of four types, not shown in the drawing. Video switch termination is conducting a video switching conference. In this conference type, one of the incoming video streams is sent to all the other participants. The selected stream can be the video stream of the active speaker who will receive the previous speaker stream or the MC can decide the displayed stream for each participant. The voice activated switching can be managed automatically by the MPMM 430, or by the MC 110. In this type of conference all video streams have the same parameters (line rate, frame rate, algorithm).

Video mixing termination conducts a video mix session that mixes N out of M streams. The MC 110 defines the incoming stream IDs for the termination, the layout and if to switch the content of a window according to the active speaker and the selected streams (participants) to be mixed for each participant. The video stream parameters can be different for each stream. Video softmix termination is a video mix session that mixes 4 incoming streams that have the same parameters (example mixing four H.261 QCIF stream to one H.261 CIF outgoing stream). Transcode termination is similar to video switch but the MC 110 defines the video mode of the termination and allows it to transcode video streams that have different parameters. In the event that the conference includes data the Data Termination (DT) 466 process the data protocols like T.120 etc. and transfers back the processed data.

The RTP Termination 461 handles the different media packet streams. It receives them from the SPNI 445 and separates them to four different streams as instructed by the MC. Control information, if received in the MP, is transferred to the MC 110 via H.248 module 447. Data is transferred to DT 466, video is transferred to VMT 465, and audio to AMT 464. On the outgoing direction, it receives the streams from the DT 465, VMT 466 and the AMT 464 and send them to the remote terminal. Stream synchronization like lip synch can be done in the RTP 461 or in the VMT 466 and AMT 464 according to MC commands. The physical unit of a termination like but not limited to an AMT 464, a VMT 465, a DT 466, H.221 MUX 463, and RTP Termination 461, which may be a modified physical unit belonging to a common MCU or a common Audio Bridge, with some modifications such as the mapping of the physical unit into logical terminations.

There are several levels of control in managing Multimedia Multipoint Conferences. For example, the MC 110 interfaces with the client by accepting requests, making reservations, setting up calls, terminating calls. The MP 120 may be part of this activity, but as a channel between the MC and the customer.

The MC 110 also manages the resources of the MP 120. The MC 110 selects the appropriate MP 120 and the appropriate type of terminations in said MP that will be involved in the conference, and also defines the type of conference and the streams that need to be present to the customer. The MPMM 430 receives the resource allocation, the type of conference and the streams that need to be present to the customer, from the MC 110. Based on this information the MPMM 130 selects the exact physical resource. Then the MPMM 430 creates the terminations and the context according to the command from the MC 110. The VMT 465, the AMT, and the DT 466 handle the stream topology. The MPMM 430 transmits to the MC the ID number of the selected terminations and status and indications about the ongoing conferences.

Real time management: the MPMM 430 manages the conference context. The MPMM 430 creates a Virtual context Manager (VCM) per conference. The VCM manages the conference. It receives indications and statuses from the terminations. In case of a conference that dynamically replaces speakers based on the loudest speaker the VCM changes the speaker based on the received indications.

Figure 5:
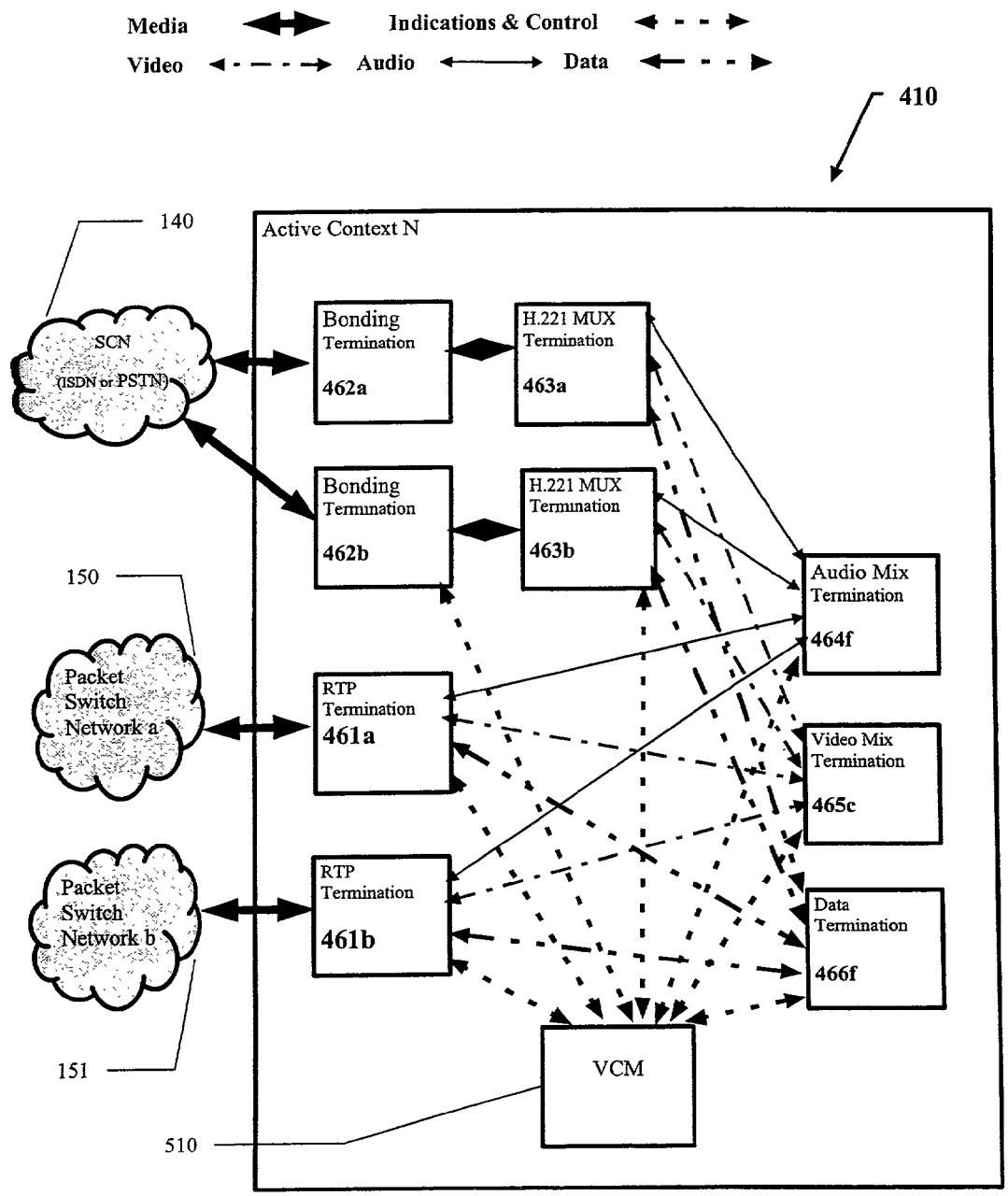
FIG. 5 is a functional block diagram of an exemplary context.

FIG. 5 is illustrating an exemplary context, Context N 410. The context is an entity that has been generated by the DMCU for the period of the conference. It is initiated by the MC (110; FIG. 4), it is constructed by the MPMM (430; FIG. 4), and its real time management is done by VCM 510. At the end of the session the MC clears the context and returns the terminations of the context to BOAT 420 (FIG. 4).

The exemplary context represents a conference of four endpoints with the following exemplary parameters. Endpoint 1 (EP1), not shown in the drawing, is connected to SCN 140 using H.320 protocol and video compression standard H.261. Endpoint 2 (EP2), not shown in the drawing, is connected to SCN 140 using H.320 protocol and video compression standard H.263. Endpoint 3 (EP3),not shown in the drawing, is connected to the Internet 150 with H.323 protocol and video compression standard H.263. Endpoint 4 (EP4),not shown in the drawing, is connected to the Internet 150 with H.323 protocol and video compression standard H.261.

The required properties for the conference are: All endpoints are Video Audio and Data Endpoints. The conference type Video Transcoding meaning that all the participant sees the current loudest speaker while the speaker sees the previous one and the video streams are transcoded to accommodate the different endpoints.

Based on the above needs, the MC (110; FIG. 4) requests from the MP (120; FIG. 4) to create a Context with the following terminations: two Bonding terminations 462; two H.221 MUX terminations 463; two RTP Terminations 461; an AMT 464; a VMT 465 and a DT 466. The VMT will be of type Transcoding Video Termination.

The MPMM 430 selects the exact terminations from the BOAT 420 and defines the streams among those terminations. For the current example the MP selects and defines the following termination and connections:

An AMT 464f is a common audio mixer that can mix the audio of at least four inputs. The AMT 464f can analyze the inputs identify the loudest speaker and send indication about the Identification of the loudest one.

A VMT 465c is a video transcoding unit it can be implemented by common transcoding methods like using four decoders, four encoders (one channel per each endpoint) and a shared video bus.

A DT 466 that can handles data protocols like T.120.

Two Bonding terminations 462a and 462b.

Two H.221 MUX terminations 463a and 463b.

And two RTP Terminations 461a and 461b.

The MPMM 430 defines the topology of the exemplary context as follow: The media stream to and from EP1 is done via Bonding termination 462a and H.221 MUX 463a. From unit 463a the Audio stream is transferred to the first channel of AMT 464f. The video stream is transferred to Channel number 1 of VMT 465c. The decoder and the encoder of channel 1 are adjusted to fit the needs of EP1. The output of the encoder of channel 1 is transferred to unit 463a. The data is transferred to DT 466f.

The media stream of EP2 is using similar path but via units 462b, 463b, the second channel in AMT 464f and the second channel of VMT 465c respectively. The media stream to and from EP3 (not shown) is done via RTP Termination 461a. From unit 461a the Audio stream is transferred to the 3rd channel of AMT 464f. The video stream is transferred to the $3^{rd}$ Channel of VMT 465c. The decoder and the encoder of channel 3 are adjusted to fit the needs of EP3. The output of the video encoder of channel 3 is transferred to unit 461a. The data is transferred to DT 466f.

The media stream of EP4 is using similar path but via units 461b, the 4th channel in AMT 464f and the $4^{th}$ channel of VMT 465c and the 4' channel of DT 466f respectively. VCM 510 receives indications from all the units. Among these indications it gets indication from AMT 465f about the loudest speaker. When the loudest speaker is changed the VCM 510 routes the output of the video encoder of the new loudest endpoint to the other three endpoints while the video to the new loudest speaker remains the same, (the video of the previous speaker).

Figure 6:
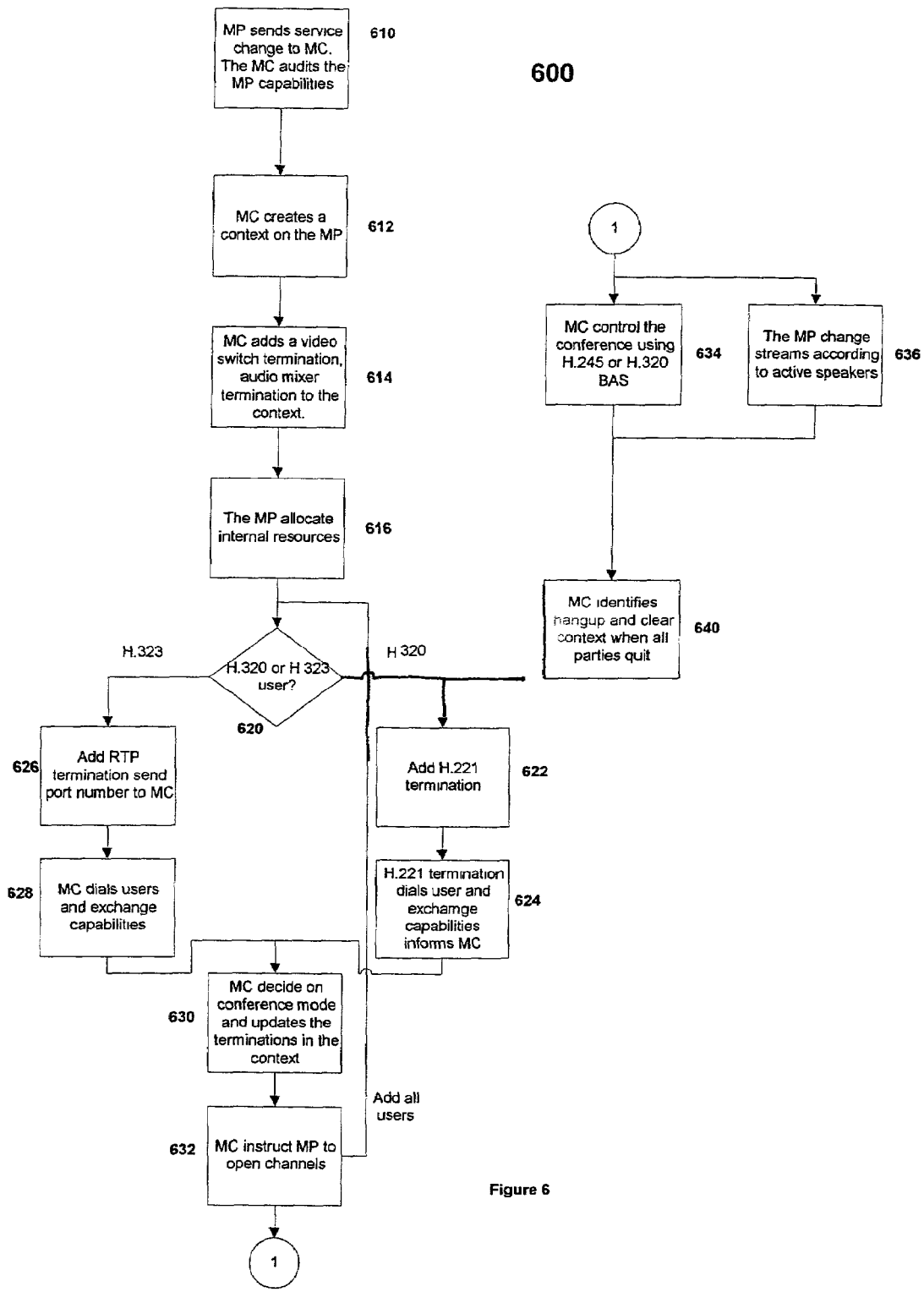
FIG. 6 is a flow diagram illustrating the steps involved in an exemplary embodiment of the present invention during the conference.

The VCM 510 informs the MC about replacing the speaker as well as any other changes in the status of the conference. In another scenario the VCM 510 only informing the MC about the loudest speaker and the MC instruct the VCM 510 to change routing. The VCM is not changing the routing automatically, FIG. 6 is a flow diagram illustrating the steps involved in an exemplary embodiment of the present invention during a conference. During the initiation step 610, the MP (120; FIG. 4) connects to the MC (110; FIG. 4) and informs the MC which termination it supports and what are the capacities and algorithms supported. This is done by sending a service change from the MP and the MC will do audit values. The MC 110 keeps track of all MPs connected to it and the capacity of each MP.

The MC (110; FIG. 3) receives the conference parameters (number of participants, dial out number etc.) from the Conferencing Service Manager (CMM 335; FIG. 3). In step 612, the MC creates the conference context on the MP (120; FIG. 3). The MC adds in step 614 the selected type of video mixer and audio mixer terminations to the conference; the selected terminations fit the definitions of the conference. The MP based on this information creates in step 616 the context with the added terminations, (VMT, AMT and the DT), and allocates the needed MP physical resource. It returns the identifiers of the context and terminations to the MC and the MC registers the conference in its database.

Depending on the type of Endpoint, the MC allocates the resources that are related to the Endpoint. The MC starts a loop on all the Endpoints. In step 620 the MC checks the type of the Endpoint. If the endpoint is using protocol H.320 the MC moves to step 622 and adds H.221 MUX Termination 463 and in cases that it needs Bonding the MC adds also a Termination 462.

The H.221 MUX Termination 463 or the Bonding termination 462, if bonding is needed, dials the user and exchange capabilities, step 624. The H.221 MUX Termination 463 updates the MC with the results of the negotiation. Another way to exchange parameters can be by the MC, which dials via a signaling gateway and using the SS7 Module 310.

The MC exchange capabilities with the endpoint and establish the communication mode. In H.320 the H.221 MUX termination will do the actual protocol but the MC will do decisions. If the Endpoint is H.323 endpoint, the MC moves to step 626, adds an RTP Termination 461 to the context on the MP 120. The MP 120 sends the port ID number to the MC.

In step 628 the MC dials the user. The H.323 protocol stack is part of the MC and the MC exchanges capabilities with the endpoint. Based on the results of the capabilities negotiations the MC in step 630 decides on the conference mode and updates the Terminations in the context. The MC updates the RTP 461 or H.221 MUX Termination 463 and the video and audio mixer terminations with the right codec information.

The MC in step 632 instructs the MP to open the channels for communication and returns to step 620 for the next Endpoint until the MC adds all the endpoints. During the conference, both logical units of the MP 120 and MC 110 in FIG. 4) control the conference. In step 634, the MC may receive H.245 commands or tunneled H.320 BAS commands that may affect the conference context. For example, getting a video fast update command from the remote end may trigger a command to the video mixer termination. In parallel and in the case of voice activated video switching, the MP in step 636, may activate speaker and notify the MC about the switching, whereupon the MC decides which method to use. In step 640, the MC identifying the end of the conference manages the conference tear down process. It will terminate calls and delete the terminations and context.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A system for controlling multimedia multipoint communication, comprising:
    a plurality of multimedia terminals;
    a multipoint controller in communication with said plurality of multimedia terminals for call signaling and call control information; and
    at least one multipoint processor unit in communication with said plurality of multimedia terminals for media information and in communication with said multipoint controller over H.248/Megaco protocol for interfacing the call signaling and the call control information between said multipoint controller and the terminals, wherein the multipoint controller is used to establish and control multipoint mixing of media; and wherein
    at least one of said plurality of multimedia terminals is a non-H.323 terminal that does not support H.323 protocol, and wherein the multipoint processor unit is capable of demultiplexing input from said non-H.323 terminal into call signaling and call control information and into media information and transferring the call signaling and the call control information to the multipoint controller over H.248/Megaco.

2. The system of claim 1, wherein the multipoint processor unit is capable of:
    receiving the call signaling and call control information from the multipoint controller directed to the non-H.323 terminal;
    multiplexing the call signaling and call control information; and
    transferring the multiplexed information to the non-H.323 terminal.

3. The system of claim 1, wherein the at least one multipoint processor unit is in communication with the plurality of multimedia terminals for call signaling and call control information.

4. The system of claim 1, wherein the multipoint controller includes an H.248 module for receiving and transmitting information from and to the multipoint processor unit.

5. The system of claim 4, wherein the multipoint controller includes a management module for managing information between the H.248 module and at least one of an H.323 stack, an SIP stack, an SS7 module, or a conference management module.

6. The system of claim 1, wherein the multipoint processor unit includes an H.248 module for receiving and transmitting information from and to the multipoint controller.

7. The system of claim 6, wherein the multipoint processor unit includes a management module for managing information between the H.248 module and at least one of a switch packet network interface, a switched circuit network interface, an active context, or a bank of available terminations.

8. A system for controlling multimedia multipoint communication between a plurality of multimedia terminals, at least one of the terminals being a non-H.323 terminal not supporting H.323 protocol, the communication including call signaling, call control, and media information, the system comprising:
    a multipoint controller handling the call signaling and call control information for the terminals; and
    a multipoint processor handling the media information for the terminals, the processor in communication with the controller over H.248/Megaco protocol and in communication with the non-H.323 terminal, the processor interfacing the call signaling and call control information between the controller and the non-H.323 terminal to establish and control multipoint mixing of media, wherein the multipoint processor unit is capable of demultiplexing input from said non-H.323 terminal into call signaling and call control information and into media information; and transferring the call signaling and the call control information to the multipoint controller over H.248/Megaco.

9. The system of claim 8, wherein the processor receives call signaling and call control information from the controller directed to the non-H.323 terminal, multiplexes the received information, and transfers the multiplexed information to the non-H.323 terminal.

10. The system of claim 8, wherein the processor is in communication with the plurality of multimedia terminals for handling the call signaling and call control information.

11. The system of claim 8, wherein the multipoint controller includes an H.248 module for receiving and transmitting information from and to the multipoint processor.

12. The system of claim 11, wherein the multipoint controller includes a management module for managing information between the H.248 module and at least one of an H.323 stack, an SIP stack, an SS7 module, or a conference management module.

13. The system of claim 8, wherein the multipoint processor includes an H.248 module for receiving and transmitting information from and to the multipoint controller.

14. The system of claim 8, wherein the multipoint processor includes a management module for managing information between the H.248 module and at least one of a switch packet network interface, a switched circuit network interface, an active context, or a bank of available terminations.

15. A method of controlling multimedia multipoint communication between a plurality of multimedia terminals supporting different multimedia conferencing protocols, at least one of the terminals being a non-H.323 terminal not supporting H.323 protocol, the communication including call signaling, call control, and media information, the method comprising:

handling the call signaling and call control information for the terminals with a multipoint controller;

handling the media information for the terminals with a multipoint processor, wherein the multipoint processor unit is capable of demultiplexing input from said non-H.323 terminal into call signaling and call control information and into media information;

communicating the call signaling and the call control information between the processor and the controller over H.248/Megaco protocol; and interfacing the call signaling and call control information between the controller and the non-H.323 terminal with the processor to establish and control multipoint mixing of media.

16. The method of claim 15, wherein interfacing the call signaling and call control information between the controller and the non-H.323 terminal with the processor comprises:

receiving input from the non-H.323 terminal;

demultiplexing the input into call signaling, call control, and media information; and transferring the call signaling and call control information to the multipoint controller over H.248/Megaco protocol.

17. The method of claim 15, wherein interfacing the signaling and call control information between the controller and the non-H.323 terminal with the processor comprises:

receiving call signaling and call control information from the multipoint controller directed to the non-H.323 terminal;

multiplexing the received information; and transferring the multiplexed information to the non-H.323 terminal.

* * * * *